Figure 1:
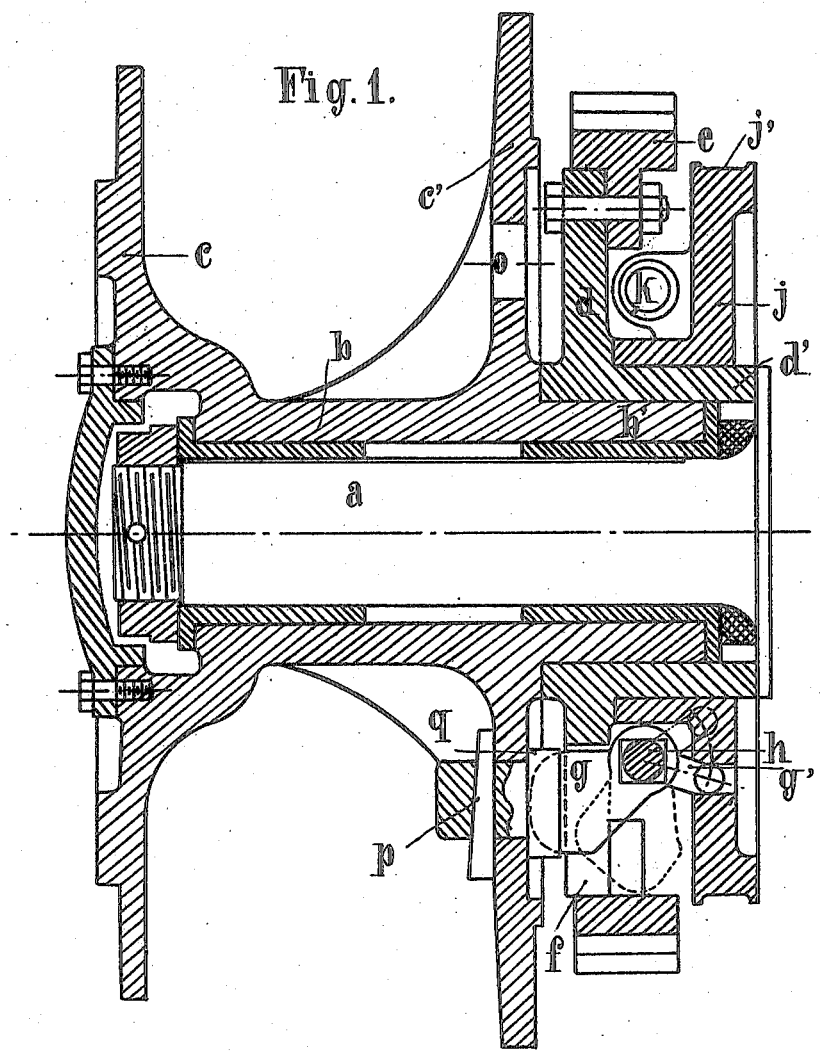

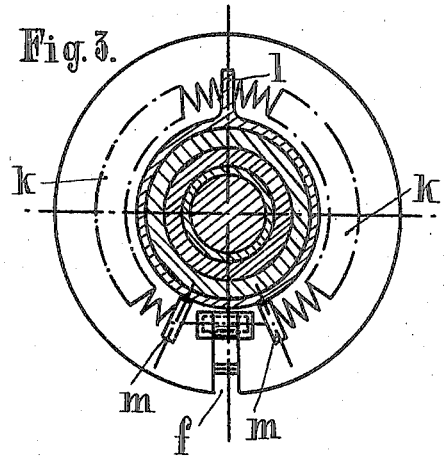
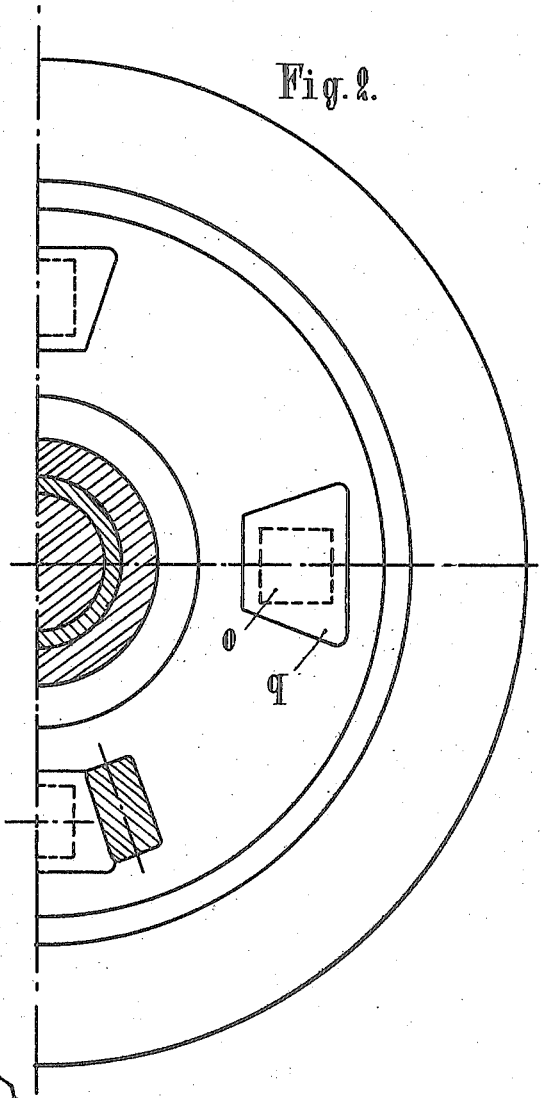
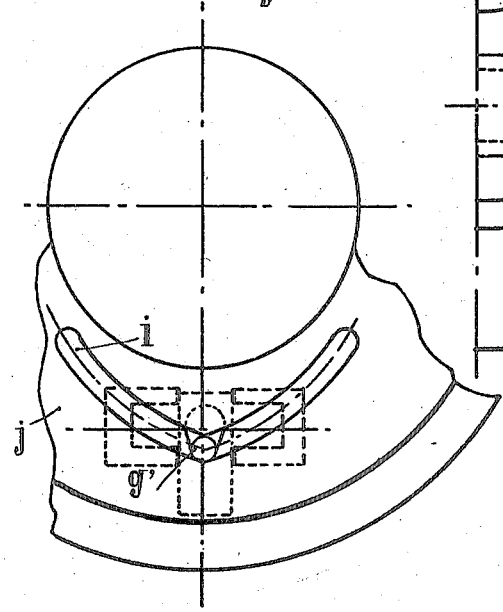

UNITED STATES PATENT OFFICE.

PETER M. WILSON, OF MARSEILLE, FRANCE.

STEERING DEVICE FOR MOTOR VEHICLES.

1,416,921.      Specification of Letters Patent.      Patented May 23, 1922.

Application filed August 15, 1921. Serial No. 492,257.

*To all whom it may concern:*

Be it known that I, PETER M. WILSON, citizen of the United States of America, and resident of Marseille, France, post-office address 25 Rue de la République, have invented new and useful Improvements in a Steering Device for Motor Vehicles, which improvements are fully set forth in the following specification.

On certain motor vehicles and, more particularly, on certain agricultural tractors, the two driving wheels are independent of each other, and steering is obtained by ceasing to drive one of the wheels, that at the side to which it is desired to turn, whilst the other wheel continues to receive the action of the driving force.

This invention relates to a steering device of the type with independent driving wheels, with cessation of drive on the wheel mounted at the side "of the rotation."

To make the following explanation as clear as possible, the accompanying drawing shows by way of example the device according to the invention.

Figure 1 is a central vertical partial section of an axle journal on which is mounted a driving wheel, Figure 2 is a half-section through a plane at right angles to that of Figure 1, and Figures 3 and 4 are detail views.

On the journal $a$ of the axle is mounted by any suitable means of industrial practice, the hub $b$ of a wheel $c$ of any desired construction.

The said hub $b$ has at $b'$ an extension on which can freely rotate a rim $d$. A toothed wheel $e$ is either secured to the rim $d$ or made in one piece with the same, and the said toothed wheel $e$ is given a movement of rotation by the action of a driving toothed pinion not shown in the drawing.

The rim $d$ has at $f$ a slot through which can swing a pawl $g$ secured to a tail $g'$. The pawl $g$ and its tail $g'$ can swing about a pin $h$ carried by any desired means on the rim $d$. The tail $g'$ can terminate in a roller, or in a rounded off part, engaging with a slot $i$ provided in a second rim, called brake rim $j$ mounted loose on the hub $d'$ of the rim $d$ and provided at $j'$ with a machined surface over which passes the brake band. The groove $i$ provided in the said rim $j$, with which engages the end of the tail of the pawl, has a V shape (Figure 4).

Two helical springs or two springs $k$ of any other shape are arranged as shown in Figures 1 and 3, in the space comprised between the two rims $d$ and $j$. These springs rest, on the one hand, against a projection $l$ secured to the rim $j$ and on the other hand, against stops $m$ provided on the rim $d$ at either side of the slot $f$.

On the inner disc $c'$ of the wheel are provided openings $o$ in which can be placed and held by means of cotter pins $p$ blocks $q$ projecting inwards at the side of the rim $d$. These blocks $q$ of any desired number, are arranged in a circle on the disc $c'$.

The working of the apparatus is as follows: the pawl $g$ occupying the position in full lines shown in Figure 1 that is to say projecting outside the slot $f$ and at the side of the disc $c'$. If a movement of rotation is transmitted to the toothed wheel $e$, the rim $d$ will begin to rotate, and the said rim, by means of the pawl $g$, will drive the wheel $c$ $c'$ owing to the said pawl $g$ meeting with one of the stops $q$. At the same time, the rim $d$ drives by means of one of the springs $k$ (according to the direction of rotation) the brake rim $j$, and the whole rotates.

If at a given moment it is desired to stop the rotation of the wheel $c$ $c'$, the brake of the rim $j$ is operated so as to stop the latter; a fixed point of support is therefore produced for the moment. Thus a relative movement of the two rims $d$, $j$ is produced, and it will be understood that in these conditions the tail $g'$ of the pawl will move in the groove $i$ and compress one of the two springs $k$. But in view of the shape of the said groove $i$, and whatever be the direction of rotation, the movement of the tail $g'$ in the said groove will produce the disappearance of the pawl $g$, that is to say the return of the said pawl into the space between the two rims $d$ and $j$. The pawl no longer projecting outwards, is no longer in contact with one of the stops $q$, and no longer drives therefore the wheel $c$ $c'$ which remains standing still. The rotation of the vehicle can therefore take place.

It goes without saying that at this moment the rim $d$ drives the rim $j$ by the tail of the pawl striking one of the ends of the groove; the brake slips.

As soon as the braking action on the rim $j$ ceases, the spring $k$ brings the tail $g'$ back to the top of the V, as shown in Figure 4, and the pawl $g$ swings about the pin $h$ in order to project outwards from the slot *f*. The driving of the wheel takes place therefore as before.

It will be seen that owing to this device, it will be possible by a simple braking action, or by the locking by any means of the rim *j*, to bring about the release of the wheel, the throwing into gear taking place on the release of the rim *j*.

The action producing the locking of the rim *j*, could be effected from the driver's seat by any suitable means controlled by hand or by the foot.

Claims:

1. A steering device for motor vehicles of the type with independent driving wheels and cessation of the driving of one of the wheels, chiefly characterized by: two independent rims, an elastic coupling part between the two rims, a brake on one of them, an oscillating driving part on the other rim constituting the driving rim, stops on the wheel in the track of the driving part, a device for bringing about disappearance of the driving part when the brake rim is stopped or locked.

2. A steering device for motor vehicles of the type with independent driving wheels and cessation of drive on one of the wheels, substantially characterized by: two independent rims, springs connecting together the two rims, a brake on one of them, a pawl oscillating through a slot of the other rim, a device for withdrawing the driving part when the brake rim is locked.

3. A steering device for motor vehicles of the type with independent driving wheels and cessation of drive on one of the wheels, chiefly characterized by: two independent rims, springs connecting together the two rims, a brake on one of them, a pawl swinging through a slot of the other rim, a tail on the said pawl, a V-shaped groove on the brake rim, for receiving the tail of the pawl, a brake band on the brake rim.

In testimony whereof I have signed this specification in the presence of two subscribing witnesses.

PETER M. WILSON.

Witnesses:
LEWIS B. R. SPARKS,
MAURICE NOUSSET.